(12) United States Patent
Yu et al.

(10) Patent No.: US 11,410,220 B2
(45) Date of Patent: Aug. 9, 2022

(54) EXPLORATION FOR INTERACTIVE RECOMMENDATION SYSTEM, METHOD, AND COMPUTER PROGRAM PRODUCT

(71) Applicant: Samsung Electronics Co., Ltd., Gyeonggi-do (KR)

(72) Inventors: Tong Yu, Mountain View, CA (US);
Yilin Shen, Mountain View, CA (US);
Hongxia Jin, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/814,241

(22) Filed: Mar. 10, 2020

(65) Prior Publication Data

US 2020/0364769 A1 Nov. 19, 2020

Related U.S. Application Data

(60) Provisional application No. 62/848,446, filed on May 15, 2019.

(51) Int. Cl.
*G06Q 30/00* (2012.01)
*G06Q 30/06* (2012.01)
*G06N 20/00* (2019.01)

(52) U.S. Cl.
CPC ......... *G06Q 30/0631* (2013.01); *G06N 20/00* (2019.01); *G06Q 30/0641* (2013.01)

(58) Field of Classification Search
None
See application file for complete search history.

(56) References Cited

U.S. PATENT DOCUMENTS 9,575,720 B2 2/2017 Faaborg et al.
10,224,035 B1 3/2019 Koenig et al.
(Continued)

OTHER PUBLICATIONS

Krstic, M., Context-aware personalized program guide based on neural network, Nov. 1, 2012, IEEE Transactions on Consumer Electronics, vol. 58, issue 4, pp. 1301-1306 (Year: 2012).*

(Continued)

*Primary Examiner* — Jeffrey A. Smith
*Assistant Examiner* — Timothy J Kang (57) ABSTRACT

Described is a system for providing improved exploration for an interactive recommendation system by leveraging intuitive user feedback. The recommendation system may provide images of recommend items and receive user feedback preferences in the form of a natural language expression. Traditional techniques for interactive recommendation systems typically rely on restricted forms of user feedback such as binary relevance responses, or feedback based on a fixed set of relative attributes. In contrast, the recommendation system described herein introduces a new approach to interactive image recommendation (or image search) that enables users to provide feedback via natural language, allowing for a more natural and effective interaction. The recommendation system may be based on formulating the task of natural-language-based interactive image recommendation as a reinforcement learning problem, and reward the recommendation system for improving the rank of the target image during each iterative interaction.

20 Claims, 5 Drawing Sheets

(56) References Cited

U.S. PATENT DOCUMENTS

| | | |
|---|---|---|
| 10,311,868 B2 | 6/2019 | Zurek et al. |
| 2002/0002502 A1 | 1/2002 | Maes et al. |
| 2004/0172267 A1 | 9/2004 | Patel et al. |
| 2011/0179081 A1 | 7/2011 | Ovsjanikov et al. |
| 2014/0074639 A1* | 3/2014 | Tian .................. G06F 16/90335 705/26.1 |
| 2014/0143720 A1 | 5/2014 | Dimarco et al. |
| 2015/0170172 A1 | 6/2015 | Gichuhi |
| 2017/0075958 A1* | 3/2017 | Duffy .................. G06F 16/2455 |
| 2017/0091319 A1 | 3/2017 | Legrand et al. |
| 2017/0193368 A1* | 7/2017 | Le Grand .............. G06N 3/084 |
| 2018/0075774 A1 | 3/2018 | Puri et al. |
| 2019/0034994 A1* | 1/2019 | Wu ........................ G06Q 50/01 |
| 2019/0043493 A1 | 2/2019 | Mohajer et al. |
| 2019/0130285 A1* | 5/2019 | Snyder .................. G06N 5/022 |
| 2019/0251446 A1* | 8/2019 | Fang ..................... G06N 3/084 |

OTHER PUBLICATIONS

International Search Report and Written Opinion of the International Searching Authority in connection with International Patent Application No. PCT/KR2020/006060 dated Aug. 14, 2020, 10 pages.

Yibarren, "Google Assistant to Provide Enriched Visual Responses on Android Devices", voicebot.ai, Apr. 2019, 8 pages.

Supplementary European Search Report dated Sep. 29, 2021 in connection with European Patent Application No. 20 80 6152, 10 pages.

\* cited by examiner

EXPLORATION FOR INTERACTIVE RECOMMENDATION SYSTEM, METHOD, AND COMPUTER PROGRAM PRODUCT

CROSS-REFERENCE TO RELATED APPLICATIONS

This application claims the benefit of U.S. Provisional Patent Application having the Application No.: 62/848,446, filed on May 15, 2019, and titled "Method and System of Exploratory Interactive Recommendation," which is incorporated by reference herein in its entirety.

TECHNICAL FIELD

This disclosure relates to search, selection and/or recommendation systems, and more particularly, improved interactive exploration for such systems.

BACKGROUND

Machine learning algorithms may be based on various paradigms such as reinforcement learning. In general, reinforcement learning is concerned with making a sequence of decisions within an environment to maximize some notion of a reward. For example, the aim of reinforcement learning is to find a balance between exploration (of uncharted territory) and exploitation (of current knowledge). Thus, reinforcement learning may be applied in numerous contexts including recommendation systems. For example, a reinforcement-learning-based recommendation system may interact with a user in discrete time steps (or iterations). At each time step, the system may receive an observation, which typically includes the reward (e.g. whether a user "likes" an item). The system may then recommend items from the set of available items, which are subsequently presented to a user. As described, the recommended set of items may be based on the system balancing the exploration vs. exploitation tradeoff, and accordingly, the effectiveness of the exploration component becomes a critical aspect of the success of the recommendation system. Traditional exploration approaches, however, often suffer from various limitations that compromise the relevance of the recommendations. For example, certain approaches often perform a relatively high degree of exploration that results in a large number of irrelevant recommendations. This often degrades performance because users often disengage when relevant results are not provided within the initial stages of interaction. In addition, traditional approaches often suffer when there are few positive samples (e.g. items being liked) to learn from during the early stages of the interaction. As a result, recommendations during the early stages of an interaction may be less relevant. Finally, traditional approaches often fail to fully leverage the exploration history when providing new recommendations. This again leads to less effective recommendations. As a result of such deficiencies, there is a continued need to improve reinforcement learning models, and more specifically, the exploration techniques implemented for recommendation systems.

SUMMARY

Described is a system (and method) for providing improved exploration for an interactive recommendation system by leveraging intuitive user feedback.

A processor of a computer may cause a subset of items within a domain of items to be presented by a computing device, each item within the domain being stored as a representation of a point within a multi-dimensional space. The processor may receive user feedback indicating a preference for a feature associated with a first item within the subset of items and identify an updated subset of items within the domain of items based on the preference. The identification may include encoding the preference into a point within the multi-dimensional space, including inputting the user feedback into an encoder that outputs the encoded point. The identification may also include determining a constrained space within the multi-dimensional space from the encoded point and selecting, as the updated subset of items, a sample of items represented as a point within the constrained space using a distribution function. The processor may then cause the updated subset of items to be presented by the computing device.

It should be noted that this Summary section is provided merely to introduce certain concepts and not to identify any key or essential features of the claimed subject matter. Many other features and embodiments of the disclosure will be apparent from the accompanying drawings and from the following detailed description.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

In some embodiments, described is a system (and method) for providing improved exploration for an interactive recommendation system by leveraging intuitive user feedback. Traditional techniques for interactive recommendation typically rely on restricted forms of user feedback, such as binary relevance responses, or feedback based on a fixed set of relative attributes, which limits their impact. In contrast, in some embodiments, the recommendation system described herein introduces a specialized approach to interactive image-based recommendation that enables users to provide feedback via natural language comments, allowing for a more natural and effective interaction. For example, the recommendation system may present images of recommend items and receive user feedback in the form of a natural language comment. The recommendation system may then process the comments and associated images to improve exploration of the recommendation system. To provide such a capability, the recommendation system may formulate the task of comment-based image recommendation as a reinforcement learning problem, and reward the recommendation system for improving the rank of the target image during each iterative interaction. Accordingly, the recommendation system may achieve better recommendation accuracy over traditional supervised and reinforcement learning baselines. Moreover, by leveraging user feedback based on natural language expressions rather than pre-specified attributes, the recommendation system may provide improved recommendation results and a more natural and expressive communication interface. Accordingly, the recommendation system may be applied in various contexts including vision search, natural language generation, and dialogue response selection.

In some embodiments, the recommendation system may continuously update a recommendation process based on of user feedback. To leverage such user feedback, the recommendation system may utilize several specialized elements (or models, formulas, frameworks, etc.) to improve exploration of the reinforcement learning problem. First, the recommendation system may provide a more controlled exploration technique that identifies items more efficiently. For example, the recommendation system may identify a constrained search space (or constrained space) within a multi-dimensional space that is fused with multimodal inputs (e.g. images and text). Second, the recommendation system may efficiently update the sampling distribution used for exploration. For example, a specialized pairwise logistic loss function that updates the controlled exploration over time may be used. In some embodiments, the specialized loss function may characterize how the exploration model fits the pairwise ranking of items based on user feedback. Accordingly, the exploration model may be updated using both a suitable logistic loss function and the specialized pairwise logistic loss function. By incorporating the specialized pairwise logistic loss function, the recommendation system may effectively derive extra data samples to augment the model to achieve higher accuracy, especially during the early phases of learning. Finally, the constrained space used to sample items (as further described herein) may be updated based on previous user interactions. For example, the current constrained space may be the weighted sum of all the previous constrained spaces.

Thus, the recommendation system may provide an improved approach to exploration by leveraging user feedback. Such a recommendation system may be provided within an operating environment as further described with reference to FIG. 1.

Figure 1:
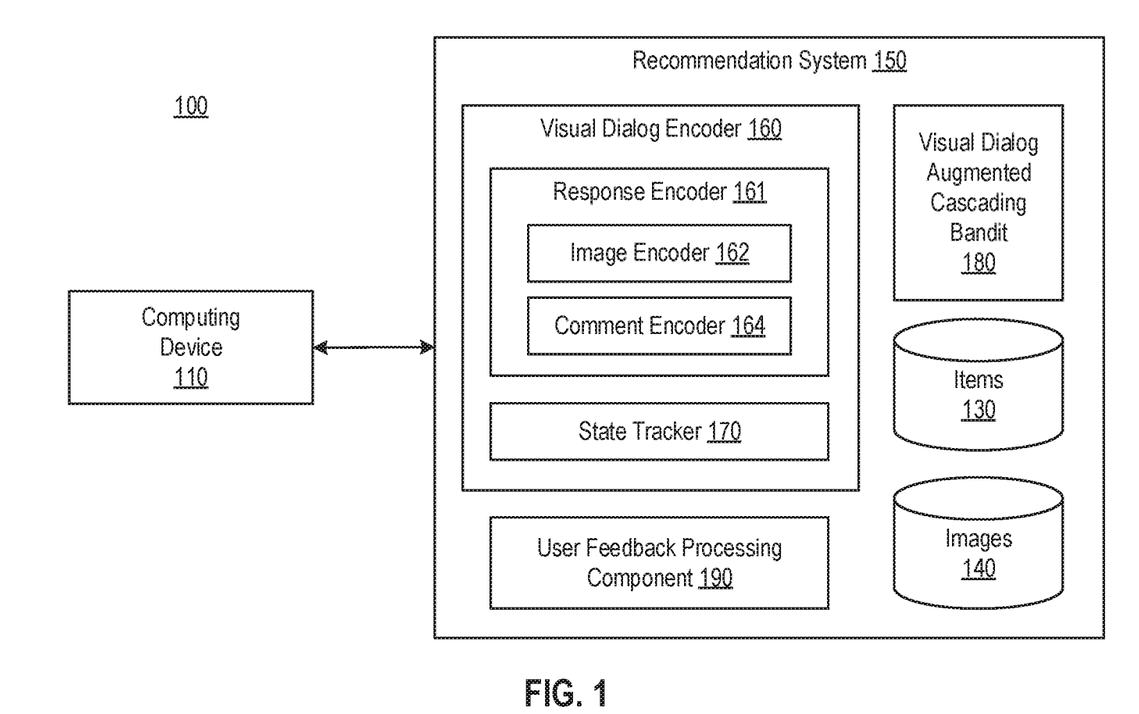
FIG. 1 is a block diagram illustrating an example operating environment for an exploratory interactive recommendation system according to one or more embodiments of the disclosure.

FIG. 1 is a block diagram illustrating an example operating environment for an exploratory interactive recommendation system according to one or more embodiments of the disclosure.

As shown, the operating environment 100 may include a computing device 110, and a recommendation system 150. The computing device 110 (e.g. desktop, laptop, tablet, smartphone, television, set-top-box, wearable device, server, etc.) may be operated by a user to interact with a recommendation system 150. As further described herein, the recommendation system 150 may provide recommend items 130 to the user. For example, the recommendation system 150 may provide (or present) the items on a website that is accessed by the computing device 110. As another example, the recommendation system 150 may provide the items within an application installed on the computing device 110. The items may be any type of item (or product, service, etc.) that may be presented or recommended to a user. For example, the items may include content (e.g. movies, songs, books, shows, magazines, articles, blogs, social media feeds, jokes, riddles, etc.), articles for sale (clothing, electronics, groceries, etc.), or any other types of items.

To provide recommendations, the recommendation system 150 may perform a specialized processing using machine learning components. These components may include one or more neural networks such as an encoder (or autoencoder). The encoders may be based on any type of model (e.g. sparse, denoising, contractive, deep, convolutional, etc.), or variant thereof. In some embodiments, the recommendations may be presented as images 140 of the items 130, and the user feedback may include comments associated with the images 140 and/or items 130. For example, the comments may be received using a microphone coupled to the computing device 110.

To perform such specialized processing, the recommendation system 150 may include a visual dialogue encoder 160. As shown, the visual dialogue encoder 160 may include one or more encoders (or neural networks) such as a response encoder 161. The response encoder 161 may include an image encoder 162, and a comment (or text) encoder 164. As further described herein, the response encoder 161 may receive various input, and in response, output information that may be used to derive recommendations. In some embodiments, the visual dialogue encoder 160 may also include a state tracker 170 to account for previous user feedback provided as part of the same (or previous) user session. For example, a user session may include a user interacting with an application that provides multiple rounds (e.g. iterations) of recommendations before the user ends the session (e.g. selects a particular item, exits or logs out of the application, etc.).

In some embodiments, one or more components of the recommendation system 150 may be trained. For example, to mitigate the cumbersome and costly process of collecting human-machine conversations as part of a learning process, the comment encoder 164 may be trained with a user simulator, which itself may be trained to describe the differences between target and candidate images of items.

In addition, as part of the reinforcement learning model, the recommendation system 150 may include a specialized bandit such as a visual dialogue augmented cascading bandit (or augmented cascading bandit) 180. In general, cascading bandits are a variant of the cascade model where the objective is to identify a plurality of the most attractive items. Traditional cascading bandits, however, are modeled to account for a single user feedback (e.g. an item selection). Instead, the augmented cascading bandit 180 described herein, may model additional user feedback associated with an image such as a combination of item browsing behavior, and natural language comments associated with particular images. To process user feedback, the recommendation system 150 may include a user feedback processing component 190. For example, the user feedback processing component 190 may include a natural language processing component to process comments provided by the user (e.g. via text, voice input, or other mechanism). In addition, the user feedback processing component 190 may also process user feedback in the form of navigational input provided by the user as further described herein.

Figure 2:
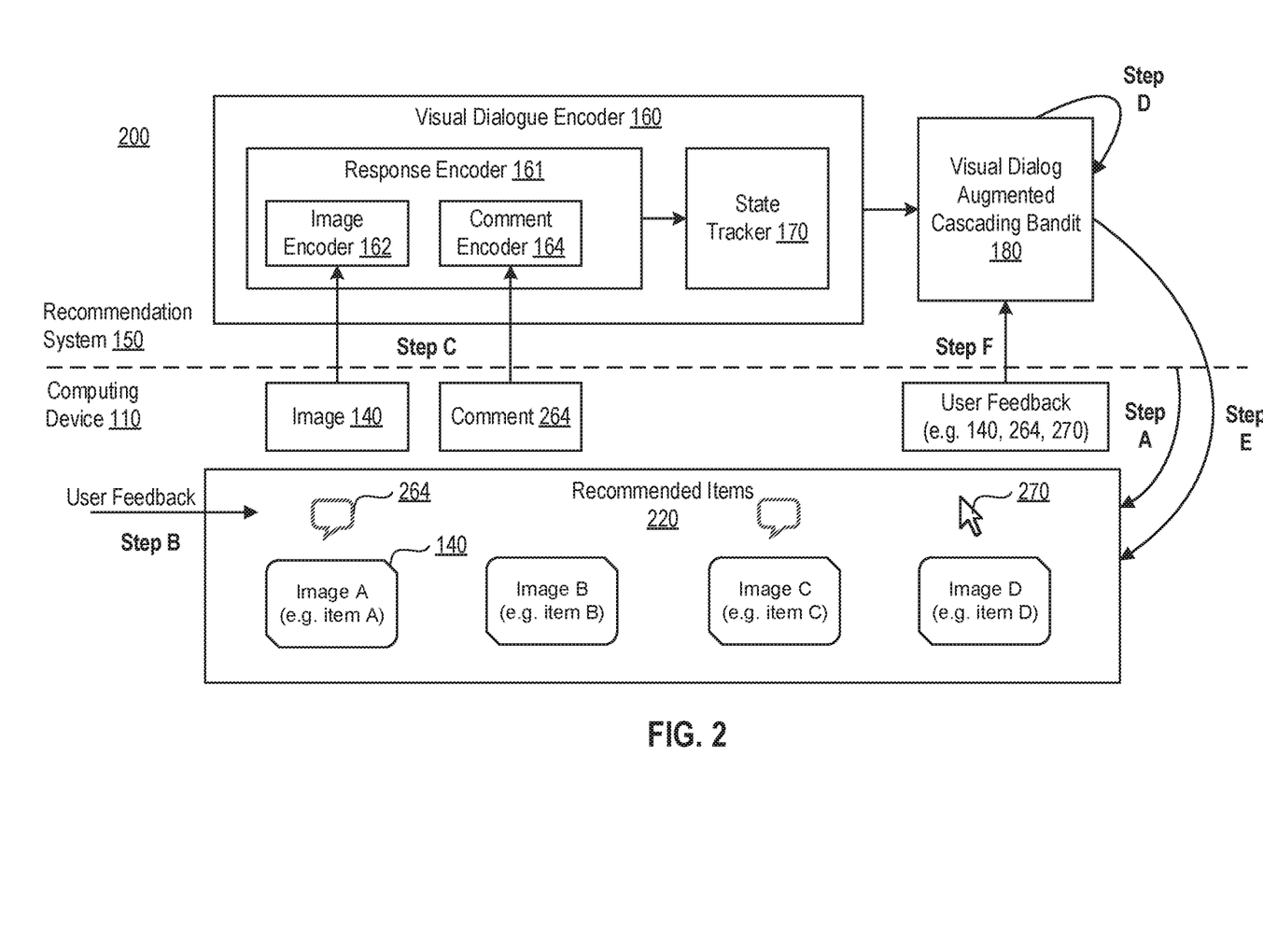
FIG. 2 is a block diagram illustrating an example interaction between components of a recommendation system when providing exploratory recommendations according to one or more embodiments of the disclosure.

Accordingly, the components of the recommendation system 150 may interact to provide exploratory recommendations as further described with respect to FIG. 2.

FIG. 2 is a block diagram 200 illustrating an example interaction between components of a recommendation system when providing exploratory recommendations according to one or more embodiments of the disclosure.

As shown in step A, the system (e.g. recommendation system 150) may provide a set of recommended items 220. The recommended items 220 may be a subset of items from a domain (e.g. items 130). For example, a particular type of article for sale (e.g. shoes), or a type of content (e.g. movies), may form a domain. The domain may be defined as generally or specifically as required depending on the particular application. In some embodiments, the recommended items 220 may be provided as part of a user session that presents multiple sets (or iterations, rounds, cycles, etc.) of recommended items 220 in response to receiving user feedback. For example, an initial set of items (or recommendations) may be presented to a user (e.g. in step A), and then a subsequent set of items (e.g. in step E as further described below) may be provided in response to user feedback. As shown, in some embodiments, the system may present each of the recommended items 220 as an image 140. Also, as in some embodiments, the system may choose to present only one item from the set of items per time.

In response to presenting the recommend items 220, the system may receive user feedback in step B. As further described below, the system may determine a preference for features (or attributes, characteristics, etc.) associated with an item based on the user feedback. As shown, different types of user feedback may be associated with different images 140. In this example, images A and B may each be associated with a comment 264, and image D may be associated with a user feedback in the form of a navigation input 270 (e.g. an input indicating a certain degree of interest in an item).

In some embodiments, a comment 264 (or phrase) may include a natural language expression (e.g. via a voice input, or typed input). For example, if the domain of items includes shoes, or women's shoes, the comment may include a natural language expression such as "I want high heeled shoes." Accordingly, based on performing a natural language processing, the recommendation system 220 may determine the user has a preference for a particular feature or attribute (e.g. type of heel). In addition, the preference may be expressed as a negative. For example, the preference may include a desire for an item to not exhibit (or contain) certain features or attributes.

In some embodiments, the navigation input 270 may indicate a degree of interest in a particular item. For example, the navigation input (or input) 270 may include an inquiry associated with an item that requests additional information (e.g. description, pictures, price, etc.). For instance, the user may click on a particular button that reveals additional information about an item.

In response to receiving the user feedback, the system may perform a specialized processing that leverages machine learning components to recommend items. Such a processing may be based on the following described operations.

As mentioned, the system may provide recommendations as part of one or more iterations (or rounds, cycles, etc.). Accordingly, as part of an initialization, the system may initialize time (or iteration) step t=1, and data sample index τ=1. In addition, the system may define: K as the number of recommended items (e.g. number of recommended items 220); d as the dimensionality of the search domain; E as the set of all items; and κ as a tunable parameter determining the size of the constrained space (or boundary). Thus, for each iteration or time t, the system may identify (or recommend) an updated subset of items.

Accordingly, in step C, user feedback information may be input into the visual dialogue encoder 160. As shown, in some embodiments, the data (or information) input into the visual dialogue encoder 160 may include one or more sets of an image 140 and an associated comment 264. For example, in this example, image A and its associated comment may be a set of data inputted into the response encoder 160. In some embodiments, multiple sets of data may be inputted into the response encoder 161. As described, the information input into the visual dialogue encoder 160 may represent one or more preferences of the user. The visual dialogue encoder 160 may then encode the one or more preferences into a point within a multi-dimensional space that represents the domain of items. To perform such an encoding, the system may identify the input received by the visual dialogue encoder 160. For example, the system may denote an image 140 of an item as $e_{t-1}$, and denote its associated comment 264 as $o_{t-1}$. As described, in some embodiments, the system may process multiple images of items along with their associated comments. The system may encode the image of item $e_{t-1}$ using the image encoder 162 (or first encoder), and denote the output as $\text{ImgEnc}(e_{t-1})$. The system may also encode the comment $o_{t-1}$ using the comment encoder 164 (or second encoder), and denote the output as $\text{TxtEnc}(o_{t-1})$.

As shown, the combined outputs of the image encoder 162 and comment encoder 164 may then be inputted into the state tracker 170 (or third encoder). For example, the state tracker 170 may account for previous user interactions with the system that are part of the same user session. In some embodiments, before being provided as input to the state tracker 170, $\text{ImgEnc}(e_{t-1})$ and $\text{TxtEnc}(o_{t-1})$ may first be concatenated to obtain an intermediate result denoted as $\text{ResEnc}(e_{t-1}, o_{t-1})$. The intermediate result $\text{ResEnc}(e_{t-1}, o_{t-1})$ may be obtained by embedding the concatenated ImgEnc $(e_{t-1})$ and $\text{TxtEnc}(o_{t-1})$ through a linear transformation. Accordingly, the intermediate result $\text{ResEnc}(e_{t-1}, o_{t-1})$ may then be used as the input into the state tracker 170. In some embodiments, the state tracker 170 may be a gated recurrent unit (GRU). The system may denote the output of the state tracker 170 as VisDiaEnc($e_{t-1}$, $o_{t-1}$).

Next, the output of the state tracker 170 may be used to determine a constrained space within the multi-dimensional space. For example, the constrained space within the multi-dimensional space may be determined based on a distance from the encoded point. For example, based on VisDiaEnc($e_{t-1}$, $o_{t-1}$), the system may derive a subset B={$x_e$|distance($x_e$,VisDiaEnc($e_{t-1}$, $o_{t-1}$))<κ} from the set of all items E, where K is the tunable parameter determining the size of the constrained space, and distance(.,.) is a distance metric. For example, the distance metric may include a Euclidian distance, graph distance, or any other type of distance metric.

In step D, the system may use the visual dialogue augmented cascading bandit (or augmented cascading bandit) 180 to select a sample of items within the determined constrained space. In some embodiments, the augmented cascading bandit 180 provides an improvement over previous cascading bandits, in that it may model various types of user feedback associated with an item such as a combination of item browsing behavior and natural language comments associated with particular images. More specifically, and as further described below, the augmented cascading bandit 180 may leverage specialized objective functions and constraints for bandit learning.

Continuing with step D, to identify a set of items, the system may first sample a model parameter from a distribution model. The distribution model (e.g. Gaussian, Gaussian mixture, etc.) utilized may depend on the particular application. For instance, the system may use a multivariable Gaussian distribution $\theta_t \sim N(\overline{\theta}_{t-1}, S_{t-1})$, where $\overline{\theta}_{t-1}$ is the mean and $S_{t-1}$ is the covariance. The system may then sample an item within the constrained space by $x_k = \text{argmax}_{x_e \in B - \{x_1, x_2, \ldots, x_{k-1}\}} x_e^T \theta_t$ for K times. Accordingly, the sampled K items R={$x_k$|1≤k≤K} may be selected as the updated subset of items (or updated recommended items).

In step E, the updated subset of items (e.g. sampled items) may be presented to the user as an updated set of recommended items. The user may then provide user feedback in response to the updated subset of items and the process may repeat. However, if the user selects a particular item (e.g. selects an item for purchase), then the recommendation process may be deemed successful, and the user session may be ended. As described, the system may continuously improve the recommendations based on user feedback.

Accordingly, in step F, the system may process the user feedback received in response to presenting the updated set of recommended items. In some embodiments, the system may process user feedback with respect to particular items. For example, in some embodiments, the augmented cascading bandit 180 may account for user feedback that includes whether a particular item is liked, whether a particular item is ignored, and whether a particular item receives a comment (e.g. whether the particular item is associated with a comment). For instance, an item may be deemed to be liked if the user indicates an interest in an item. For example, interest in an item may be inferred from a user providing a navigation input 270 that requests more information for the item. Accordingly, to account for the interest in an item, if item $x_k$ is liked by the user, the system may define $y_\tau = 1$. However, if item $x_k$ is ignored by the user (e.g. the user does not show interest in the item), the system may define $y_\tau = 0$. In addition, the system may define $z_\tau = x_k$, and $\tau = \tau + 1$.

With respect to comments 264, if $x_k$ receives a user comment $o_t$, the system may define $z_\tau = \text{VisDiaEnc}(e_{t-1}, o_{t-1}) - x_k$, $y_\tau = 1$, and $\tau = \tau + 1$. It should be noted that $x_k$ (which may also be denoted by $e_t$) and $o_t$, may be used as the input to the visual dialogue encoder 160 (e.g. as part of step C) for the next iteration t+1.

Accordingly, in response to processing the user feedback, the system may update the sampling performed by the augmented cascading bandit 180. For example, the covariance S and mean θ of the Gaussian distribution used by cascading bandit 180 may be updated such that: the covariance $S_t = (\Sigma_{i=1}^{\tau} \sigma(z_i^T \theta_t) (1 - \sigma(z_i^T \theta_t)) z_i z_i^T + 1_d)^{-1}$; and mean $\overline{\theta}_t = \text{argmin}_\theta \lambda \theta^T \theta - \Sigma_{i=1}^{\tau} y_i \log(\sigma(z_i^T \theta_t)) - \Sigma_{i=1}^{\tau} (1 - y_i) \log(1 - \sigma(z_i^T \theta_t))$.

In addition, in some embodiments, the system may also adaptively alter the constrained space used for sampling items based on subsequent user feedback. For example, if the user provides similar comments in subsequent user feedback, the system may infer that the constrained space may need to be increased. As another example, if the user requires a high number of iterations to find a desired item, the system may infer that the constrained space may need to be decreased.

Accordingly, the recommendation model may be continuously updated to perform improved exploration by leveraging each iteration of user feedback.

In addition, or alternatively, in some embodiments, the system may account for additional user behaviors that may be part of the user feedback (e.g. in step F). For example, the system may account for additional types of user input associated with an item. More specifically, in some embodiments, the augmented cascading bandit 180 may account for whether an item is liked (or deemed to be attractive), examined, clicked, and whether a comment is provided with respect to the item. Accordingly, in such embodiments, the augmented cascading bandit 180 may model the user input based on a set of variables. For example, the variables may include: $X_k$, V, M, C, and O, where ($x_k$) indicates the item in the k-th position from the start of the list of recommended items 220; $V(x_k)$ indicates whether the item in the k-th position is deemed to be attractive by the user; $M(x_k)$ indicates whether the item in the k-th position is examined by the user; $C(x_k)$ indicates whether the item in the k-th position is clicked by the user; and $O(x_k)$ indicates whether the item in the k-th position is associated with a comment provided by the user. In addition, as part of modeling the user behavior, the system may create the following dependencies amongst the variables. First, if an item is examined but not clicked, it may be presumed the user will examine the next item; if particular is examined and clicked, it may be presumed the user will not examine any items after the particular item in the list; and if a particular item is not examined, it may be presumed the user will not examine any items after the particular item in the list. Second, it may be presumed only when an item is deemed attractive and examined, will the user will click the item. Finally, when an item is deemed attractive and examined, it may be presumed the user is satisfied with the item, and thus, the user will not provide further comments on the items. For example, when an item is deemed to be examined but not attractive, it may be presumed the user is going to comment on the item with probability β. In some embodiments, the value of β may depend on both the current $X_k$ and the preferences of the user. In addition, in some embodiments, the system may adjust the value of β based on instructions provided to the user. For example, the system may provide instructions (e.g. via an interface) on the types of comments that may be provided by the user. In addition, in some embodiments, the system may request particular types of user feedback from the user.

Accordingly, in such embodiments, the system may update the sampling performed by the augmented cascading bandit 180 based on the additional types of user input. For example, the covariance S and mean θ of the Gaussian distribution used by cascading bandit 180 may be updated based on the additional types of user input.

In addition, in the embodiment described in diagram 200, the recommendation system may be aware of the position of the items (e.g. images) within the list of recommended items that are associated with a comment. However, in some embodiments, the recommendation system may account for a scenario in which the position of the item associated with a comment is not known. More specifically, in such embodiments, the recommendation system may include an irrelevant item filter (not shown) to predict which items within the list of recommended items are associated with a comment provided by the user. For example, the irrelevant item filter may be 3-layer neural network, which receives an image and a comment as input. The irrelevant item filter may be trained using a supervised learning setting on a set of pre-collected images and comments. Accordingly, the irrelevant item filter may output whether a particular comment is associated with a particular item within the recommended list. This filtered output may then be provided to the visual dialogue encoder 160, and the processing may continue as described above.

Although previously stated, it should be reiterated that although the above operations are described as part of a process flow, certain operations may be performed in a differing order, or may be performed in parallel.

Figure 3:
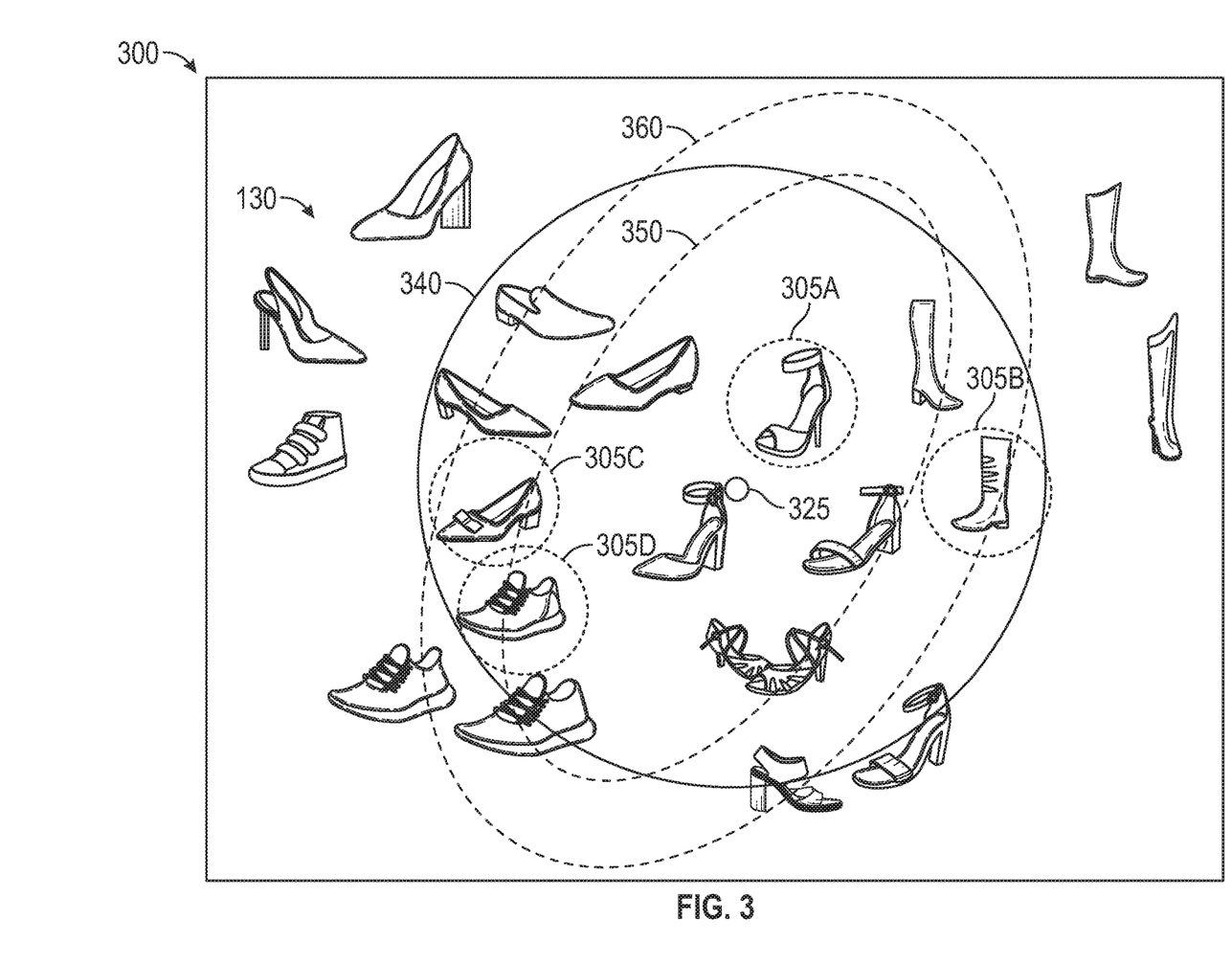
FIG. 3 is a diagram illustrating an example representation of performing exploration by sampling items within a constrained space according to one or more embodiments of the disclosure.

FIG. 3 is a diagram 300 illustrating an example representation of performing exploration by sampling items within a constrained space according to one or more embodiments of the disclosure.

As shown in this example, the system (e.g. recommendation system 150) may recommend items 305A-D from a domain of items 130, which in this example are types of shoes. As described, the domain of items 130 may be shoes that are represented as points within a multi-dimensional space, and the point 325 may represent the encoded preference that is obtained from performing a processing of the user feedback. In some embodiments, the point 325 may represent the preference that is encoded from multimodal input provided by the user to the system. For example, as described, the input may include an image representing an item (e.g. image 140) and an associated comment (e.g. comment 264), which may both be input into an encoder (e.g. visual dialogue encoder 160). For example, the comment (e.g. "I want high heeled shoes") and the associated image (e.g. image of a low heeled shoe) may be input into the encoder, which then outputs point 325. Accordingly, point 325 may represent a preference of the user (e.g. a preference for high heeled shoes while maintaining other features of the low heeled shoe).

The system may then provide exploratory recommendations based on the determined point 325. For example, to increase the probability of recommending a desired type of shoe, the system may recommend various styles of shoes associated with the preference of high heeled shoes such as high-heel boots, high-heel sneakers, high-heel sandals, etc. To provide such recommendations, as shown, the system may determine a constrained space 340 where the density of the high-heel shoes is high, and accordingly, perform exploration within this constrained space. As described, the system may sample K shoes (e.g. 4 shoes in this example) from a modeled distribution. Accordingly, as shown, the system may sample 4 shoes (e.g. shoes 305A-D) within the constrained space 340 based on a probability density function. For example, the probability density function may be represented by zones 350 and 360. For example, the probability of shoes being sampled from zone 350 is higher compared to the probability of shoes being sampled from zone 360.

Accordingly, in some embodiments, the system provides a specialized exploration that potentially provides more relevant recommendations compared to traditional approaches. For example, using a Greedy approach to exploration, only the 4 closest items to point 325 would be selected. As a result, the recommendations for shoes may not be as diverse. As another example, using a technique without constraints would result in items being selected based only on a probability density function. As a result, the selected shoes may include shoes outside of the constrained space 340, and thus, may not satisfy a preference provided by a user. In contrast, in some embodiments, the system described herein provides an exploration technique that balances providing a diverse set of results while still being connected to a natural language preference provided by the user.

Figure 4:
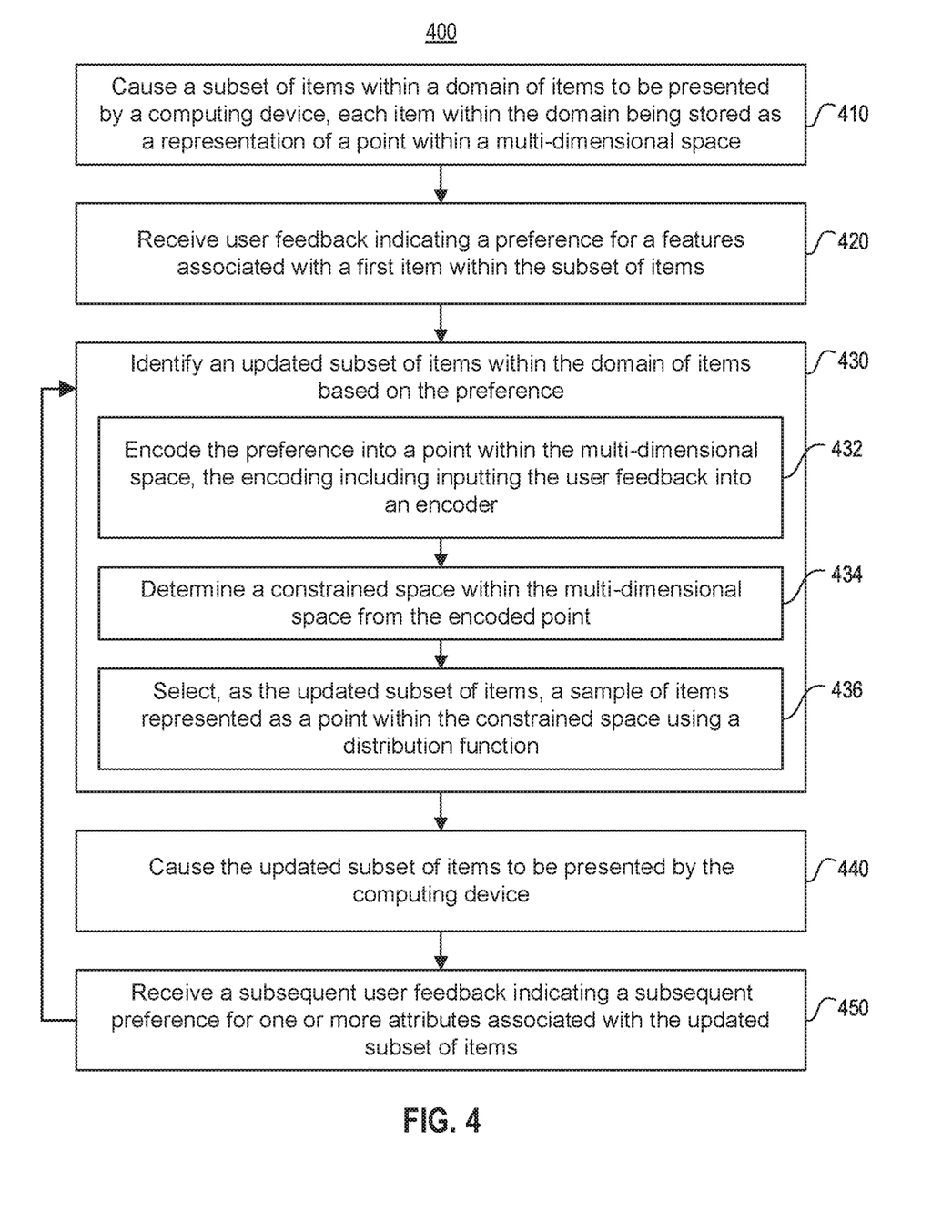
FIG. 4 is a flow diagram illustrating an example method of providing exploratory recommendations according to one or more embodiments of the disclosure.

FIG. 4 is a flow diagram illustrating an example method of providing exploratory recommendations according to one or more embodiments of the disclosure. Process 400 may use processing logic, which may include software, hardware, or a combination thereof. For example, process 400 may be performed by a system including one or more components described in operating environment 100.

In 410, the system (e.g. recommendation system 150) may cause a subset of items within a domain of items to be presented by a computing device (e.g. computing device 110). For example, the system may present (or provide) the subset of items on a display coupled to the computing device. The domain of items may include any set (or list) of items that may be presented to a user. For example, each of the items may be presented as an image (e.g. image 140). In some embodiments, each item within the domain may be stored as a representation of a point within a multi-dimensional space. For example, each item may be represented as an ordered tuplet of n terms, $(a_1, a_2, \ldots, a_n)$ where n is the dimension of the multi-dimensional space (e.g. 256 dimensions) in which the point is located. Such a tuplet may be stored within a data structure by the system.

In 420, the system may receive user feedback indicating a preference for a feature (or features) associated with a first item within the subset of items. In some embodiments, the user feedback may include a comment that is associated with a first item. For example, the comment may include a natural language expression that indicates a preference for a feature associated with the first items, or the domain of items in general. In some embodiments, a feature may be a measurable property or characteristic associated with an item that may be used by a machine learning component (or encoder) to identify items. For example, a feature may include one or more attributes that include information that describes characteristics (or qualities) of an item. For instance, attributes associated with the item domain of footwear may include attributes associated with a style, shape, type, color, heel, etc. By way of example, the first item may be an image of a shoe with a low heel, and in response, the comment may include a natural language expression such as "I want high heeled shoes." Accordingly, based on performing a natural language processing, the system may determine the user has a preference for a particular feature or attribute (e.g. high heel).

As described, the system may provide an updated set of items (e.g. updated set of recommendations) as part of an iterative process based on the user feedback.

Accordingly, in 430, the system may identify an updated subset of items within the domain of items based on the preference. As part of a process to identify the updated items, the system may perform various operations (or sub-processes, steps, etc.).

As part of a process to identify the updated items, first, in 432, the system may encode the preference into a point within the multi-dimensional space. In some embodiments, the encoding process may include inputting user feedback into an encoder (e.g. visual dialogue encoder 160) that outputs the encoded point. In some embodiments, the encoder may include multiple encoders (or machine learning components/algorithms). For example, the encoder may include a response encoder (e.g. response encoder 161), and a state tracker (e.g. state tracker 170). In some embodiments, the response encoder may include a comment encoder (e.g. comment encoder 164), and an image encoder (e.g. image encoder 162). In some embodiments, these encoders may be neural network encoders.

As described, in some embodiments, the recommendation system may be based on presenting images of items to a user, and in response, receiving one or more comments from a user as feedback. Thus, in some embodiments, the encoding may include encoding an image of the first item using a first encoder (e.g. image encoder), and encoding an associated comment using a second encoder (e.g. text encoder). In some embodiments, the outputs from the image encoder and text encoder may be input into a third encoder (e.g. state tracker). The state tracker may account for previous user feedback (e.g. previous user comments, or navigation inputs).

More specifically, in some embodiments, encoding the preference into the point within the multi-dimensional space may include inputting the user feedback into the encoder. In some embodiments, inputting the user feedback into the encoder may include inputting the comment into the comment encoder, and inputting an image representing the first item into the image encoder. Accordingly, the encoded point may be output based on a combination of the outputs from the comment encoder and the image encoder. In addition, in some embodiments, encoding the preference into the point within the multi-dimensional space may further include inputting the outputs from the text encoder and the image encoder into a state tracker that outputs the encoded point based on previous user feedback.

As part of the encoding process, the system may perform an initialization. For example, the system may initialize time step t=1, and data sample index $\tau$=1. In addition, the system may define K as the number of recommended items; d as the dimensionality of the search domain; E as the set of all items; and $\kappa$ as a tunable parameter determining the size of the constrained space. Thus, for each iteration or time t, the system may identify (or recommend) an updated subset of items by performing the operations as further discussed below.

For example, in some embodiments, as part of the encoding process, the system may denote an image of an item as $e_{t-1}$, and denote its associated comment as $o_{t-1}$. In some embodiments, the system may process multiple images of items along with their associated comments. The system may encode the image of item $e_{t-1}$ using the image encoder, where the output is denoted as ImgEnc($e_{t-1}$), and encode the comment $o_{t-1}$ using the comment encoder, where the output is denoted as TxtEnc($o_{t-1}$).

The outputs of the image and comment encoders may then be inputted into a state tracker. For example, ImgEnc($e_{t-1}$) and TxtEnc($o_{t-1}$) may be concatenated to obtain an intermediate result ResEnc($e_{t-1}$, $o_{t-1}$). In some embodiments, the intermediate result ResEnc($e_{t-1}$, $o_{t-1}$) may be obtained by embedding the concatenated ImgEnc($e_{t-1}$) and TxtEnc($o_{t-1}$) through a linear transformation. Accordingly, the intermediate result ResEnc($e_{t-1}$, $o_{t-1}$) may then be used as the input to the state tracker. Accordingly, the system may denote the output of the state tracker as VisDiaEnc($e_{t-1}$, $o_{t-1}$), which may then be used to determine a constrained space within the domain of items as described next.

Next, in 434, the system may determine a constrained space within the multi-dimensional space from the encoded point. For example, based on VisDiaEnc($e_{t-1}$, $o_{t-1}$), the system may derive a subset B={$x_e$|distance($x_e$, VisDiaEnc($e_{t-1}$, $o_{t-1}$))<$\kappa$} from the set of all items E, where K is the tunable parameter determining the size of the constrained space, and distance(.,.) is a distance metric. For example, the distance metric may include a Euclidian distance, graph distance, etc.

Finally, in 436, the system may select a sample of items represented as a point within the constrained space using a distribution function as the updated subset of items. For example, the system may first sample a model parameter from a distribution model. In some embodiments, the distribution function may be based on a multivariable Gaussian distribution. For instance, the system may user a multivariable Gaussian distribution, $\theta_t \sim N(\overline{\theta}_{t-1}, S_{t-1})$, where $\overline{\theta}_{t-1}$ is the mean and $S_{t-1}$ is the covariance. The system may then sample an item within the constrained space by $x_k = \mathrm{argmax}_{x_e \in B - \{x_1, x_2, \ldots, x_{k-1}\}} x_e^T \theta_t$, for K times. Accordingly, the sampled K items R={$x_k$|1≤k≤K} are selected as the updated subset of items, which may be presented to the user as an updated set of recommended items.

Accordingly, once the updated subset of items have been identified, in 440, the system may cause the updated subset of items (or list) to be presented by the computing device to the user. If the user selects a particular item (e.g. for purchase) from the updated subset of items, the system may deem the recommendation process a success, and end the recommendation process.

Alternatively, in some embodiments, the user may provide subsequent (or additional) user feedback, and the recommendation process may continue based on the subsequent user feedback. For example, in 450, the system may receive a subsequent user feedback indicating a subsequent preference for one or more features associated with the updated subset of items. Accordingly, as shown, the system may perform a subsequent iteration of (or repeat) identifying the updated subset of items within the domain of items (e.g. operation 430) by using the subsequent preference as the preference to be encoded. The system may then cause the updated subset of items identified by performing the subsequent iteration to be presented by the computing device.

In some embodiments, the system may account for user feedback that includes whether a particular item is liked (e.g. whether a user shows interest in an item), whether a particular item is ignored (e.g. the user does not show interest in the item), and whether a particular item receives a comment (e.g. whether the particular item is associated with a comment). Accordingly, to account for the interest in an item, if item $x_k$ is liked by the user, the system may define $y_\tau$=1. However, if item $x_k$ is ignored by the user, the system may define $y_\tau$=0. In addition, the system may define $z_\tau = x_k$, and $\tau = \tau + 1$.

With respect to comments, if $x_k$ receives a user comment $o_t$, the system may define $z_\tau = \text{VisDiaEnc}(e_{t-1}, o_{t-1}) - x_k$, $y_\tau = 1$, and $\tau = \tau + 1$. It should be noted that $x_k$ (which may also be denoted by $e_t$) and $o_t$, may be used as the input to the encoder for the next iteration t+1.

Accordingly, in response to processing the user feedback, the system may update at least one of a mean or a covariance of the distribution function based on the subsequent user feedback. For example, the covariance S and mean θ of the Gaussian distribution used by system may be updated such that: the covariance $S_t = (\Sigma_{i=1}^{\tau} \sigma(z_i^T \theta_t) (1 - \sigma(z_i^T \theta_t)) z_i z_i^T + 1_d)^{-1}$; and mean $\bar{\theta}_t = \text{argmin}_\theta \lambda \theta^T \theta - \Sigma_{i=1}^{\tau} y_i \log(\sigma(z_i^T \theta_t)) - \Sigma_{i=1}^{\tau} (1 - y_i) \log(1 - \sigma(z_i^T \theta_t))$.

Accordingly, the recommendation configuration may be continuously updated by leveraging subsequent user feedback to perform improved exploration, and the system may repeat the recommendation process as many times as necessary until a user has found a desired item.

Figure 5:
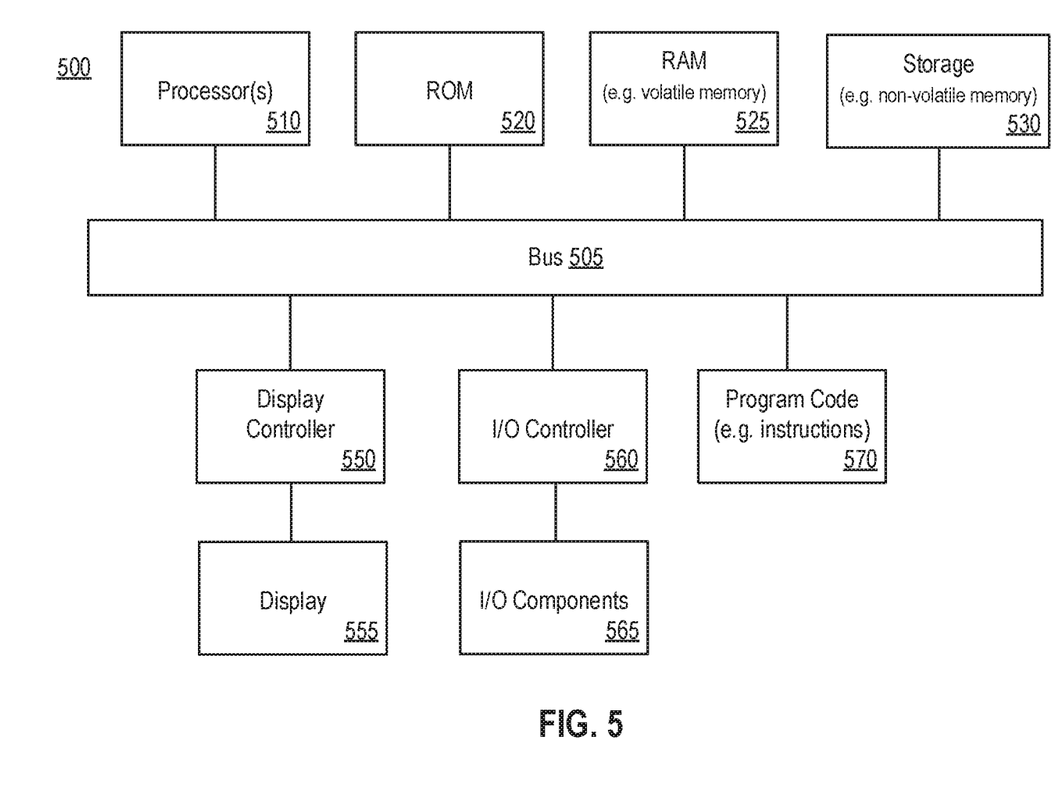
FIG. 5 is a block diagram illustrating an example computing system that may be used in conjunction with one or more embodiments of the disclosure.

FIG. 5 shows a block diagram of an example of a computing system that may be used in conjunction with one or more embodiments of the disclosure. For example, computing system 500 (or system, or server, or computing device, or device) may represent any of the devices or systems (e.g. computing device 110, recommendation system 150, etc.) described herein that perform any of the processes, operations, or methods of the disclosure. Note that while the computing system 500 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 500 may include a bus 505 which may be coupled to a processor 510, ROM (Read Only Memory) 520, RAM (or volatile memory) 525, and storage (or non-volatile memory) 530. The processor(s) 510 may retrieve stored instructions from one or more of the memories 520, 525, and 530 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 510 may perform operations in an on-demand or "cloud computing" environment or as a service (e.g. within a "software as a service" (SaaS) implementation). Accordingly, the performance of operations may be distributed among the one or more processors 510, whether residing only within a single machine or deployed across a number of machines. For example, the one or more processors 510 may be located in a single geographic location (e.g. within a home environment, an office environment, or a server farm), or may be distributed across a number of geographic locations. The RAM 525 may be implemented as, for example, dynamic RAM (DRAM), or other types of memory that require power continually in order to refresh or maintain the data in the memory. Storage 530 may include, for example, magnetic, semiconductor, tape, optical, removable, non-removable, and other types of storage that maintain data even after power is removed from the system. It should be appreciated that storage 530 may be remote from the system (e.g. accessible via a network).

A display controller 550 may be coupled to the bus 505 in order to receive display data to be displayed on a display device 555, which can display any one of the user interface features or embodiments described herein and may be a local or a remote display device. The computing system 500 may also include one or more input/output (I/O) components 565 including mice, keyboards, touch screen, network interfaces, printers, microphones, speakers, and other devices. Typically, the input/output components 565 are coupled to the system through an input/output controller 560.

Program code 570 may represent any of the instructions, applications, software, libraries, toolkits, modules, components, engines, units, functions, logic, etc. as described herein (e.g. visual dialogue encoder 160, image encoder 162, comment encoder 164, state tracker 170, augmented cascading bandit 180, etc.). Program code 570 may reside, completely or at least partially, within the memories described herein (e.g. non-transitory computer-readable media), or within a processor during execution thereof by the computing system. Program code 570 may include both machine code, such as produced by a compiler, and files containing higher-level or intermediate code that may be executed by a computing system or other data processing apparatus (or machine) using an interpreter. In addition, program code 570 can be implemented as software, firmware, or functional circuitry within the computing system, or as combinations thereof. Program code 570 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that references to ordinal numbers such as "first," "second," "third," etc., may indicate an adjective for an element (e.g. any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements. In addition, the use of the term "or" indicates an inclusive or (e.g. and/or) unless otherwise specified. For example, the phrase "at least one of x, y, or z" means any one of x, y, and z, as well as any combination thereof. In addition, the term "based on" is used to describe one or more factors that affect a determination. These terms do not foreclose additional factors that may affect a determination. For example, the phrase "determining A based on B" includes B being a factor that affects the determination of A, and does not foreclose the determination of A from also being based on C. However, in other instances, A may be determined based solely on B, such as by the use of the terms "only," "solely," and other such terminology. In addition, the term "approximately" or "substantially" may be used herein and may be interpreted as "as nearly as practicable," "within technical limitations," and the like.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system comprising:
one or more processors; and
a non-transitory computer readable medium storing a plurality of instructions that when executed cause the one or more processors to:
cause a subset of items within a domain of items to be presented on a display, each item within the domain being stored as a representation of a point within a multi-dimensional space;
receive user feedback indicating a preference for a feature associated with a specified item within the subset of items, the user feedback including a comment associated with the specified item and an image representing the specified item;
use at least one neural network to identify an updated subset of items within the domain of items based on the preference, wherein the instructions that when executed cause the one or more processors to use the at least one neural network to identify the updated subset of items include instructions that when executed cause the one or more processors to:
input the comment into a comment encoder of the at least one neural network,
input the image into an image encoder of the at least one neural network,
use the image encoder and the comment encoder to encode the image and the comment into an intermediate result,
input the intermediate result into a state tracker,
output an encoded point within the multi-dimensional space from the state tracker,
determine a constrained space within the multi-dimensional space from the encoded point, and
select, as the updated subset of items, a sample of items represented as points within the constrained space using a distribution function; and
cause the updated subset of items to be presented on the display.

2. The system of claim 1, wherein the instructions when executed further cause the one or more processors to:
update at least one of a mean or a covariance of the distribution function based on a subsequent user feedback.

3. The system of claim 2, wherein the distribution function is based on a multivariable Gaussian distribution.

4. The system of claim 1, wherein the distribution function comprises a cascading bandit.

5. The system of claim 1, wherein the comment encoder is trained with a user simulator.

6. The system of claim 1, wherein the state tracker comprises a gated recurrent unit.

7. The system of claim 1, wherein the state tracker is configured to generate the encoded point from the intermediate result based on previous user feedback.

8. A method comprising:
causing a subset of items within a domain of items to be presented on a display, each item within the domain being stored as a representation of a point within a multi-dimensional space;
receiving user feedback indicating a preference for a feature associated with a specified item within the subset of items, the user feedback including a comment associated with the specified item and an image representing the specified item;
using at least one neural network to identify an updated subset of items within the domain of items based on the preference, wherein using the at least one neural network to identify the updated subset of items includes:
inputting the comment into a comment encoder of the at least one neural network,
inputting the image into an image encoder of the at least one neural network,
using the image encoder and the comment encoder to encode the image and the comment into an intermediate result,
inputting the intermediate result into a state tracker,
outputting an encoded point within the multi-dimensional space from the state tracker,
determining a constrained space within the multi-dimensional space from the encoded point, and
selecting, as the updated subset of items, a sample of items represented as points within the constrained space using a distribution function; and
causing the updated subset of items to be presented on the display.

9. The method of claim 8, further comprising:
updating at least one of a mean or a covariance of the distribution function based on a subsequent user feedback.

10. The method of claim 9, wherein the distribution function is based on a multivariable Gaussian distribution.

11. The method of claim 8, wherein the distribution function comprises a cascading bandit.

12. The method of claim 8, wherein the comment encoder is trained with a user simulator.

13. The method of claim 8, wherein the state tracker comprises a gated recurrent unit.

14. The method of claim 8, wherein the state tracker generates the encoded point from the intermediate result based on previous user feedback.

15. A computer program product comprising a non-transitory computer-readable medium having computer-readable program code embodied therein to be executed by one or more processors, the program code including instructions to:
cause a subset of items within a domain of items to be presented on a display, each item within the domain being stored as a representation of a point within a multi-dimensional space;
receive user feedback indicating a preference for a feature associated with a specified item within the subset of items, the user feedback including a comment associated with the specified item and an image representing the specified item;
use at least one neural network to identify an updated subset of items within the domain of items based on the preference, wherein the instructions to use the at least one neural network to identify the updated subset of items include instructions to:
input the comment into a comment encoder of the at least one neural network, input the image into an image encoder of the at least one neural network, use the image encoder and the comment encoder to encode the image and the comment into an intermediate result, input the intermediate result into a state tracker, output an encoded point within the multi-dimensional space from the state tracker, determine a constrained space within the multi-dimensional space from the encoded point, and select, as the updated subset of items, a sample of items represented as points within the constrained space using a distribution function; and cause the updated subset of items to be presented on the display.

16. The computer program product of claim 15, wherein the program code includes further instructions to:

update at least one of a mean or a covariance of the distribution function based on a subsequent user feedback.

17. The computer program product of claim 15, wherein the distribution function comprises a cascading bandit.

18. The computer program product of claim 15, wherein the comment encoder is trained with a user simulator.

19. The computer program product of claim 15, wherein the state tracker comprises a gated recurrent unit.

20. The computer program product of claim 15, wherein the state tracker is configured to generate the encoded point from the intermediate result based on previous user feedback.

* * * * *